US 6,634,824 B2

(12) United States Patent
Liu

(10) Patent No.: US 6,634,824 B2
(45) Date of Patent: Oct. 21, 2003

(54) CONNECTIVE DEVICE IN A PARTITION SCREEN SYSTEM

(76) Inventor: Yu-An Liu, No. 34, Alley 31, Lane 647, Sec. 6, Chung-Hua Rd., Hsinchu (TW)

( * ) Notice: Subject to any disclaimer, the term of this patent is extended or adjusted under 35 U.S.C. 154(b) by 0 days.

(21) Appl. No.: 10/002,228

(22) Filed: Dec. 5, 2001

(65) Prior Publication Data
US 2003/0039507 A1 Feb. 27, 2003

(30) Foreign Application Priority Data
Aug. 23, 2001 (TW) ..................... 90214499 U

(51) Int. Cl.[7] .............. F16L 41/00; E04B 1/38
(52) U.S. Cl. ............ 403/217; 52/282.2; 403/170; 403/188; 403/231
(58) Field of Search ............. 403/170, 217, 403/174, 171, 169, 180, 182, 183, 218, 175, 382, 403, 187, 188, 230, 231, 381; 52/731.5, 220.1, 239, 282.2, 655.1, 653.1, 36.4, 36.1, 238.1; 211/162, 187, 189, 193, 205; 160/135

(56) References Cited

U.S. PATENT DOCUMENTS

| | | | | |
|---|---|---|---|---|
| 4,021,973 A | * | 5/1977 | Hegg et al. ............ 52/239 X |
| 4,585,131 A | * | 4/1986 | Crossman et al. ...... 211/189 X |
| 4,805,365 A | * | 2/1989 | Bastian .................. 52/282.2 |
| 5,690,239 A | * | 11/1997 | Ballard | |
| 5,816,000 A | * | 10/1998 | Izatt et al. ............. 52/239 X |
| 6,397,537 B2 | * | 6/2002 | Auer et al. ............. 52/282.2 |

FOREIGN PATENT DOCUMENTS

GB  2102466 A * 2/1983

\* cited by examiner

Primary Examiner—Gregory J. Binda
Assistant Examiner—Ryan M. Flandro
(74) Attorney, Agent, or Firm—Troxell Law Office PLLC

(57) ABSTRACT

A connective device in a partition and screen system comprises at least and upright post, a plurality of retaining pins, a plurality of trunking parts longitudinal, and at least a partition. The upright post is cylindrical with a homogeneous cross section with longitudinal slide grooves circumferentially disposed through the entire length thereof. The retaining pins are selectively inserted into the slide grooves and each of the retaining pins has an arched side with two opposite lateral edges. The trunking parts are connected to the respective coupling pieces so as to be positioned next to the upper end and the lower end of the upright post. The partition fits with two of the trunking parts in a way of being disposed between one next to the upper end of the upright post and the other one next to the lower end of the upright post.

14 Claims, 13 Drawing Sheets

CONNECTIVE DEVICE IN A PARTITION SCREEN SYSTEM

BACKGROUND OF THE INVENTION

1. Field of the Invention

The present invention relates to connective device in a partition and screen system, and, particularly to a connective device, which can be associated with partitions and screens set up indoors or in an office to constitute a fully closed partition system or an open screen system.

2. Description of Related Art

Originally, partitions and screens used in a building are made of wood material and it is known that the wood material is inflammable and extremely unsafe. A conventional fire preventive partition available in the market provides two plaster tablets sandwiching a layer of fiberglass with a surrounding frame of galvanized iron channel. However, the fiberglass may become droopy and wrinkled at the bottom of the frame after a period of time and it is not possible to perform the original function of fire prevention and sound insulation thereof. Moreover, once the conventional fire prevention partition is detached, the parts thereof are not possible to be recycled for being used again and it results in a waste of resource.

A more advanced modular partition and screen system available in the market provides a connective device as shown in FIGS. 1A and 1B. The connective device comprises a leg post 50 axially attached with an upper angular joint 10 and a connector 20 is joined to the angular joint 10 by way of a screw component 30. Besides, two transverse levers 41, 42 are perpendicular to each other with a respective axis thereof facing the axis of the angular joint 10 such that a screw component 31 can pass through a hole 25 in the connector 20 to fasten the transverse levers 41, 42. Finally, the angular joint 10 at the top and the lateral side thereof is attached with an end cap 60 and a decoration strip 14 respectively. However, the connective device provided no intercalation of fire prevention and sound insulation so that it is not suitable for the partition and screen system.

SUMMARY OF THE INVENTION

A primary object of the present invention is to provide a connective device, which enhances a partition and sound insulation system to offer a high mobility and more flexibility while in use.

A secondary object of the present invention is to provide a connective device, which uses less parts for saving the material adopted in the partition and sound insulation system and the parts thereof can be reused after being detached to carry out the purpose of environment protection genuinely.

A further object of the present invention is to provide a connective device, which is arranged in a partition and sound insulation system to offer an appearance pleasing to the eye, fire prevention, heat insulation, sound insulation, being economical and handiness for being set up.

Accordingly, the connective device in a partition and screen system according to the present invention comprises at least an upright post, a plurality of retaining pins, a plurality of trunking parts, and at least a partition. The upright post is cylindrical with a homogeneous cross section with longitudinal slide grooves circumferentially disposed through the entire length thereof. Each of the slide grooves has an elongated opening communicating with the outside. The retaining pins are selectively inserted into the slide grooves and each of the retaining pins at a lateral side thereof is an arched side with two opposite lateral edges such that two flat sides extending from the two opposite lateral edges in a way of being orthogonal each other. Both of the two flat sides or one of the two flat sides can extend outward a horizontal coupling piece to join with the trunking parts. The trunking parts are connected to the respective coupling piece so as to be positioned next to the upper end and the lower end of the upright post. The partition fits with two of the trunking parts in a way of being disposed between one next to the upper end of the upright post and the other one next to the lower end of the upright post.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1A:
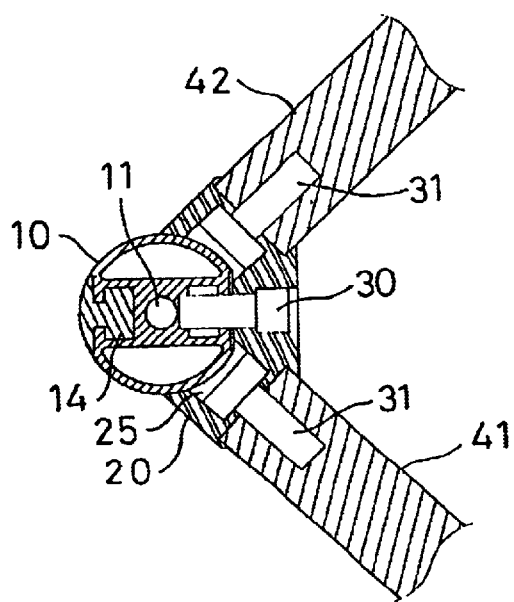
FIG. 1A shows a sectional view of a conventional connective device in a partition and screen system.
Figure 1B:
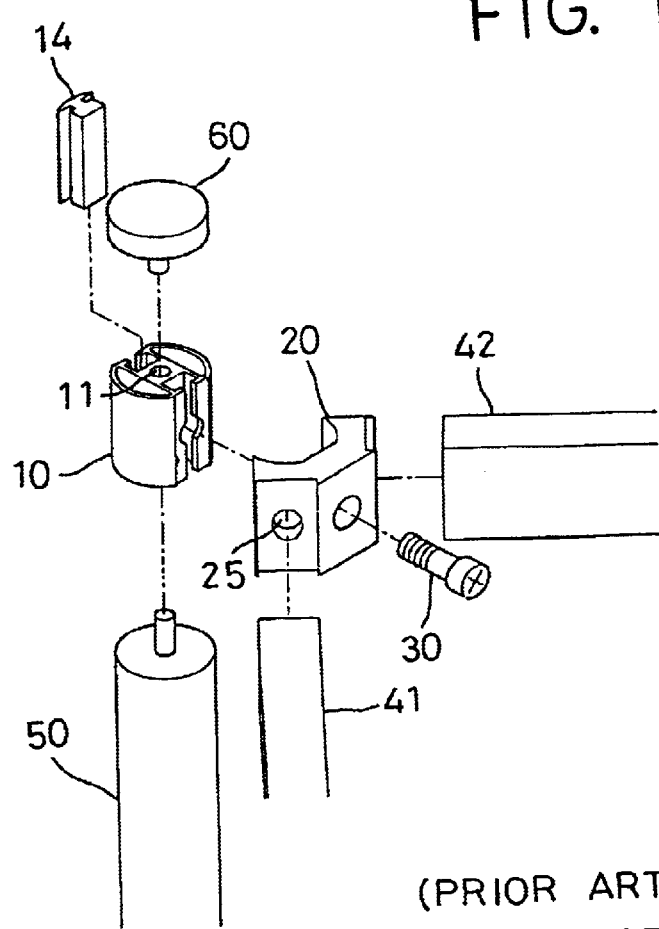
FIG. 1B shows a perspective view of a conventional connective device in a partition and screen system.
Figure 2:
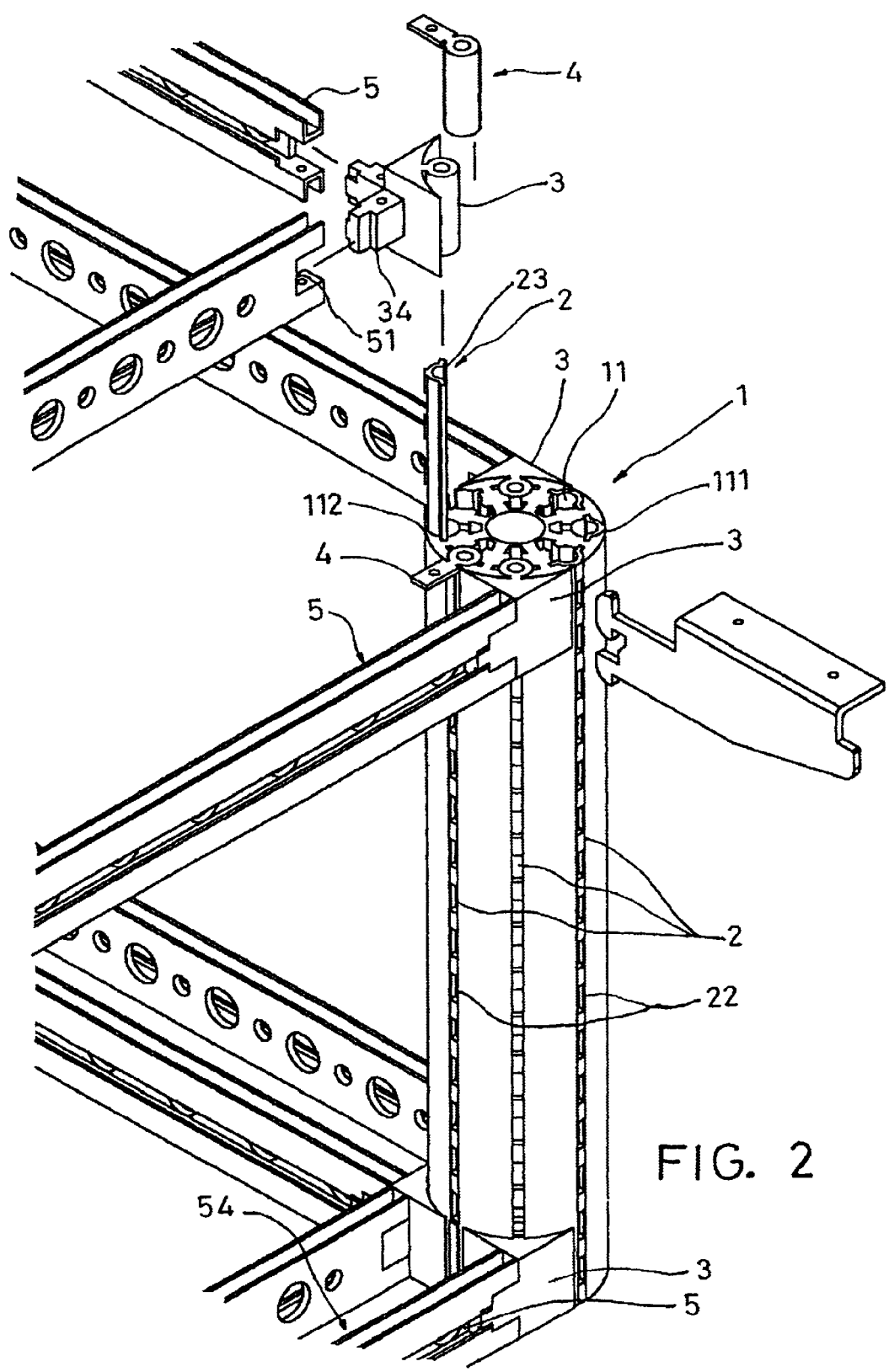
FIG. 2 is a disassembled perspective view of a connective device in a screen partition system according to the present invention.

Referring to FIG. 2, a connective device in a partition and screen system according to the present invention comprises an upright post 1, a plurality of insert strips 2, a plurality of retaining pins 3, a plurality of joint pins 4, a plurality of trunking part 5, and at least a partition 6.

Figure 3:
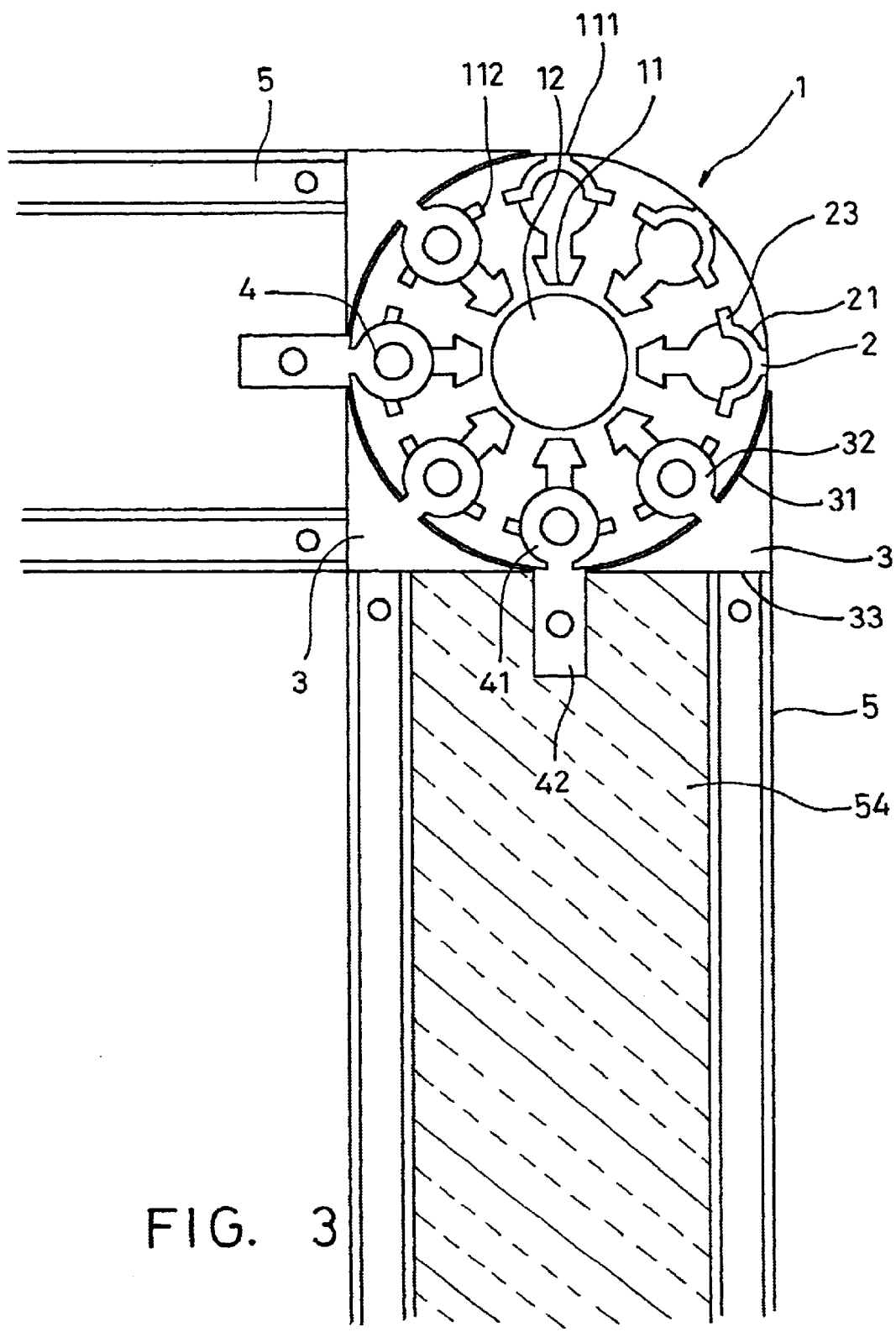
FIG. 3 is a top view of the connective device shown in FIG. 2 after assembling.
Figure 4:
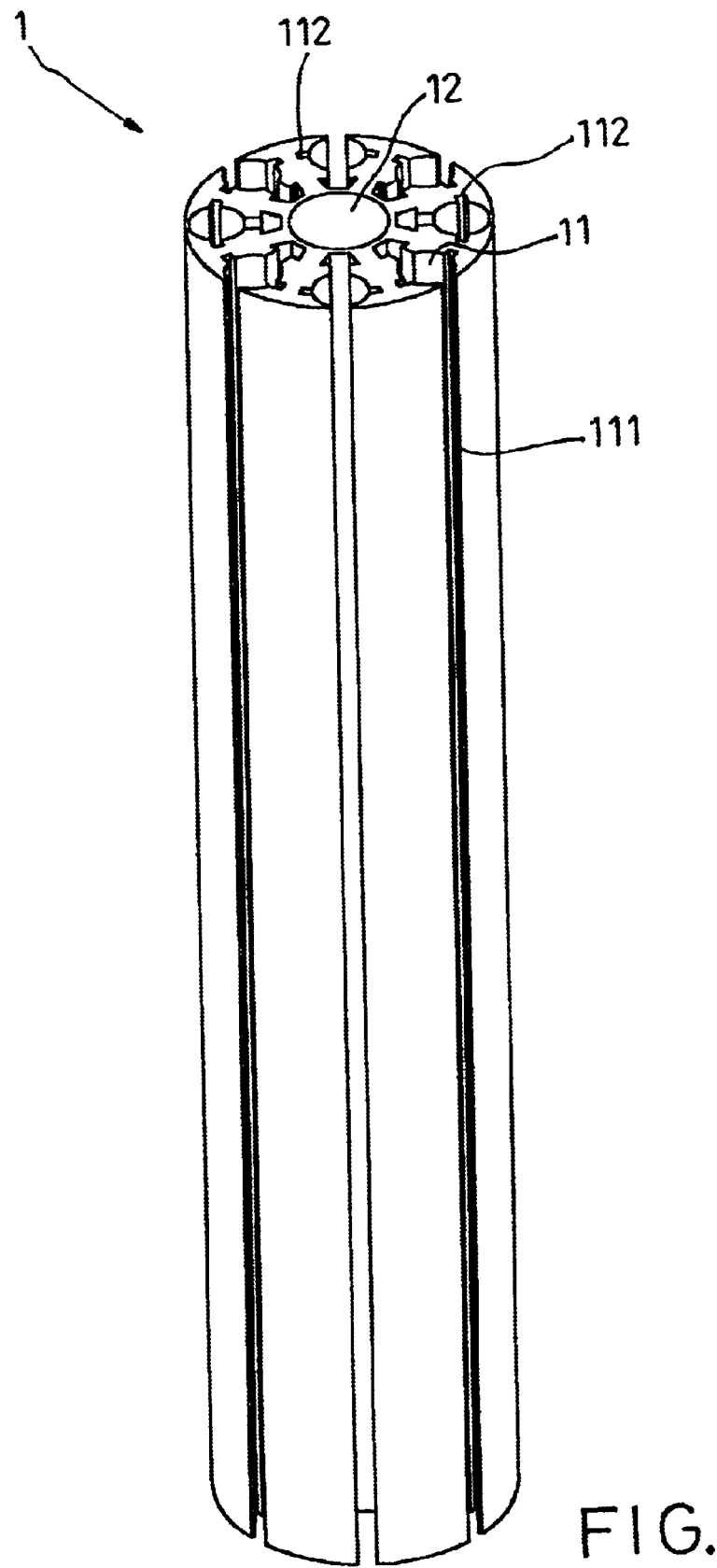
FIG. 4 is a perspective view of an upright post in the connective device of the present invention.

Wherein, the upright post 1 is cylindrical and made of extrusion molding with a homogeneous cross section through the entire length thereof and a plurality of longitudinal slide grooves 11 are provided circumferentially next to the periphery of the upright post 1 for being inserted with the insert strips 2, the retaining pins 3, or the joint pins 4 as shown in FIGS. 3 and 4. The respective slide groove 11 is formed with a shape of key hole notch in practice so that the slide groove 11 has a groove opening 111 to communicate with the outside and extends laterally two opposite slit sections 112 for two lateral projections 23 of the respective insert strip 2 being inserted into there. Thus, the insert strip 2 can be located at the upright post 1 and the structural strength between the insert strip 2 and the upright post 1 can be increased substantially. Besides, the upright post 1 at the central area thereof has a longitudinal through hole 12 and the longitudinal through hole 12 can be made to communicate with the neighboring slide grooves 11 partly such that wires such as power source electrical wires, telephone wires, and signal wires can be received in the through hole 12 to facilitate the wire arrangement.

Figure 5:
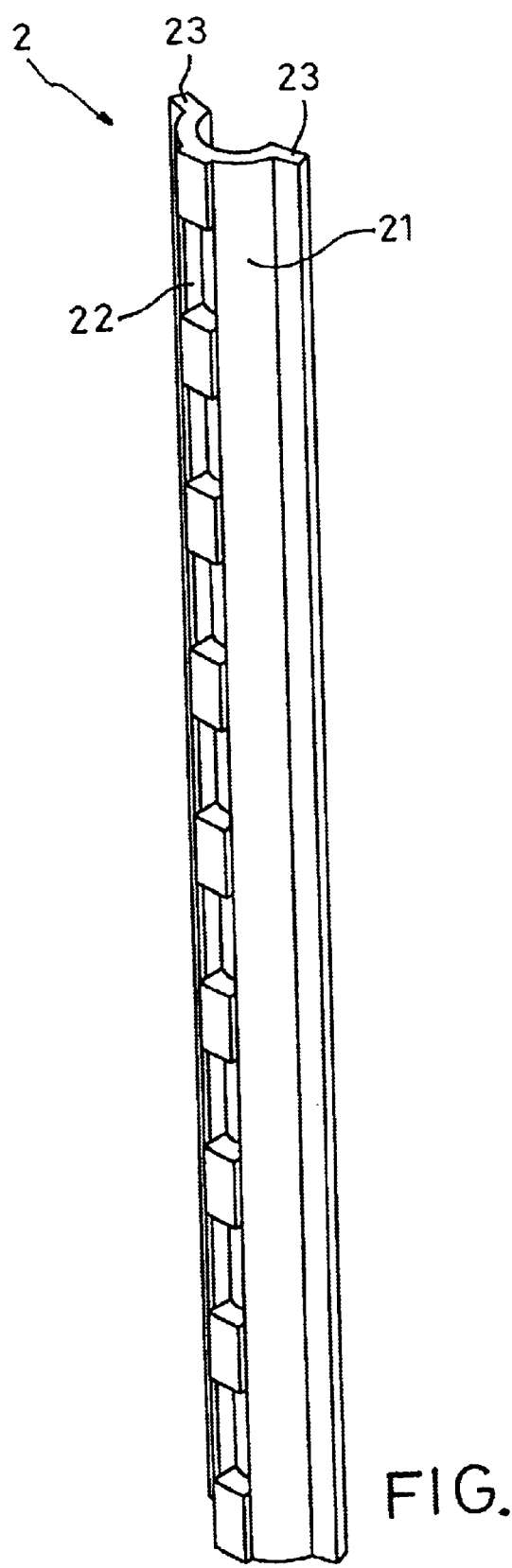
FIG. 5 is a perspective view of an insert strip in the connective device of the present invention.

Referring to FIGS. 3 and 5 in company with FIG. 2, each insert strip 2 is an elongated thin piece with an arched section 21 corresponding to each slide groove 11 so that the insert strip 2 can be inserted into an received in the slide groove 11. Thus, each retaining pin 3 or each joint pin 4 can be astride disposed on the insert strip 2 and/or supported by the insert strip 2. In practice, a plurality of hanging slots 22 are arranged on the arched section 21 longitudinally in a way of lining up and equally spacing apart each other to correspond to the groove opening 111. The hanging slots 22 are available for the user to hang or lay articles such as a display rack, a white board, a chart, a stand, a drawing picture, and etc. such that it not necessary for the user to drill holes through the wall surface and damage the integrity of the wall. Besides, the hanging slots 22 can be used for hanging or suspending fire prevention material or sound insulation made of fiberglass, which are arranged in a confining space 54 for receiving fire prevention material or sound insulation between two opposite trunking parts 5 as shown in FIG. 2. In this way, the fire prevention material or the sound insulation material can be free from downward wrinkle and shrinkage such that the function of fire safety and sound absorption can be attained effectively. Further, the insert strip 2 has to opposite lateral projection sections 23 for being inserted into the slit sections 112 of the slide groove 11 to prevent from the insert strip 2 moving aside or falling out.

Figure 6A:
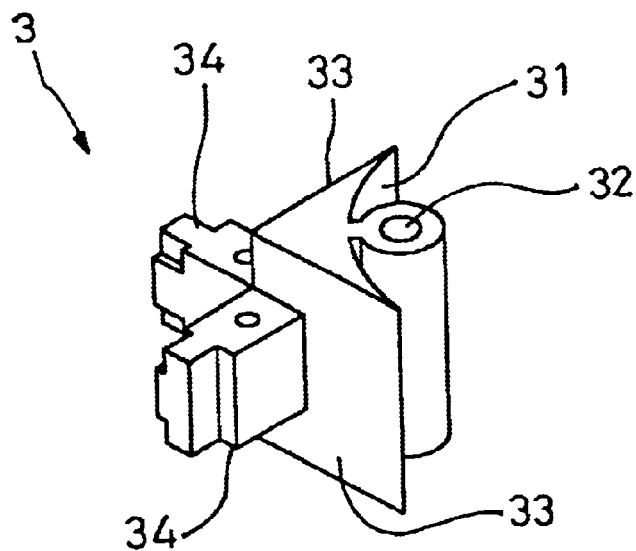
FIGS. 6A and 6B are perspective views of retaining pins in the connective device of the present invention.
Figure 6B:
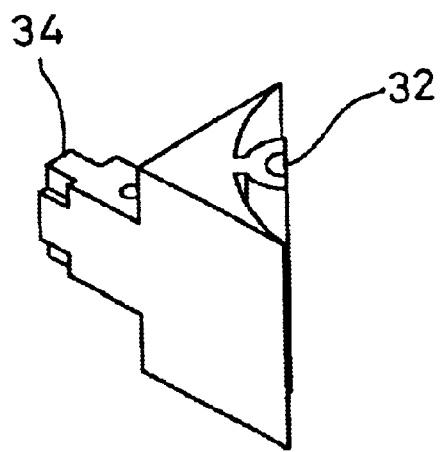

Referring to FIGS. 6A and 6B in company with FIGS. 2 and 3 again, each retaining pin 3 provides a circular lateral side 31, which preferably has an arc corresponding to less than one quarter of the circumference of the upright post 1, and a cylindrical or semi-cylindrical engaging pin 32 extends outward from the circular lateral side 31. The cylindrical or semi-cylindrical engaging pin 32 is inserted into a selected slide groove 11 and disposed astride the insert strip 2 and/or supported by the insert strip 2 such that the retaining pin 3 can be fixed in place. The circular lateral side 31 at two opposite lateral edges thereof has a flat side 33 respectively and the two flat sides 33 are orthogonal each other. A coupling piece 34 extends outward from each flat side 33 or from one of the two flat sides 33 horizontally depending on the position of the trunking parts 5 being set up such that the trunking parts 5 can engages with the upright post firmly. In this way, a firm construction between upright posts 1 can be obtained.

Figure 7:
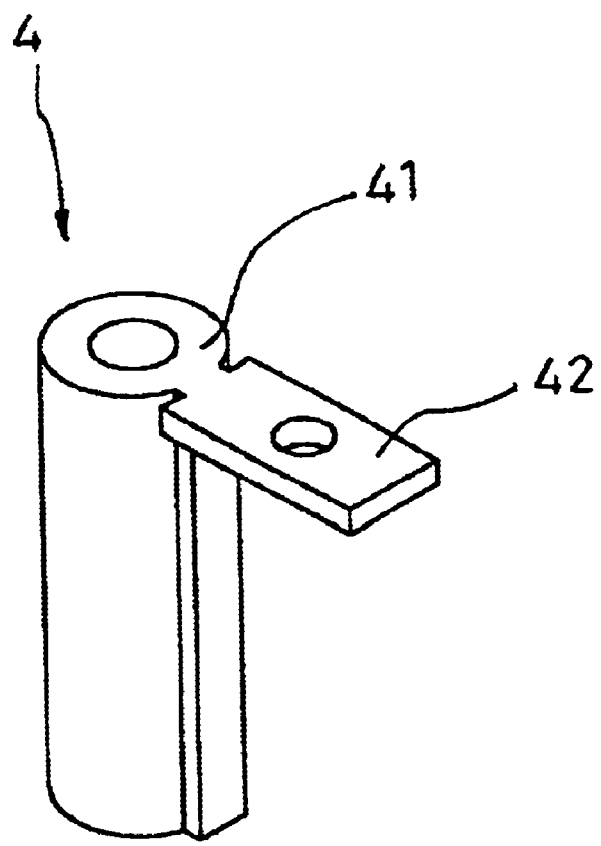
FIG. 7 is a perspective view of a joint pin in the connective device of the present invention.

Referring to FIG. 7 in company with FIGS. 2 and 3 again, each joint pin 4 can be fixedly attached to the upper end and the lower end of the upright post 1 selectively such that the upright post 1 can be fixed to the floor for a screen system or to the floor and the ceiling for a partition system. The joint pin 4 provides a pin part 41 to be inserted into a selected slide groove 11 and fixedly disposed astride the insert strip 2 and/or supported by the insert strip 2 such that the joint pin can be fixed in place. Further, the pin part 41 at the upper end thereof extends laterally an engaging plate 42 with an engaging hole such that the joint pin 4 can be fixed to the floor and/or the ceiling as soon as a bolt is fastened to the floor and/or the ceiling through the engaging hole within the engaging plate 42. In this way, the upright post 1 can keep upright firmly.

Figure 8:
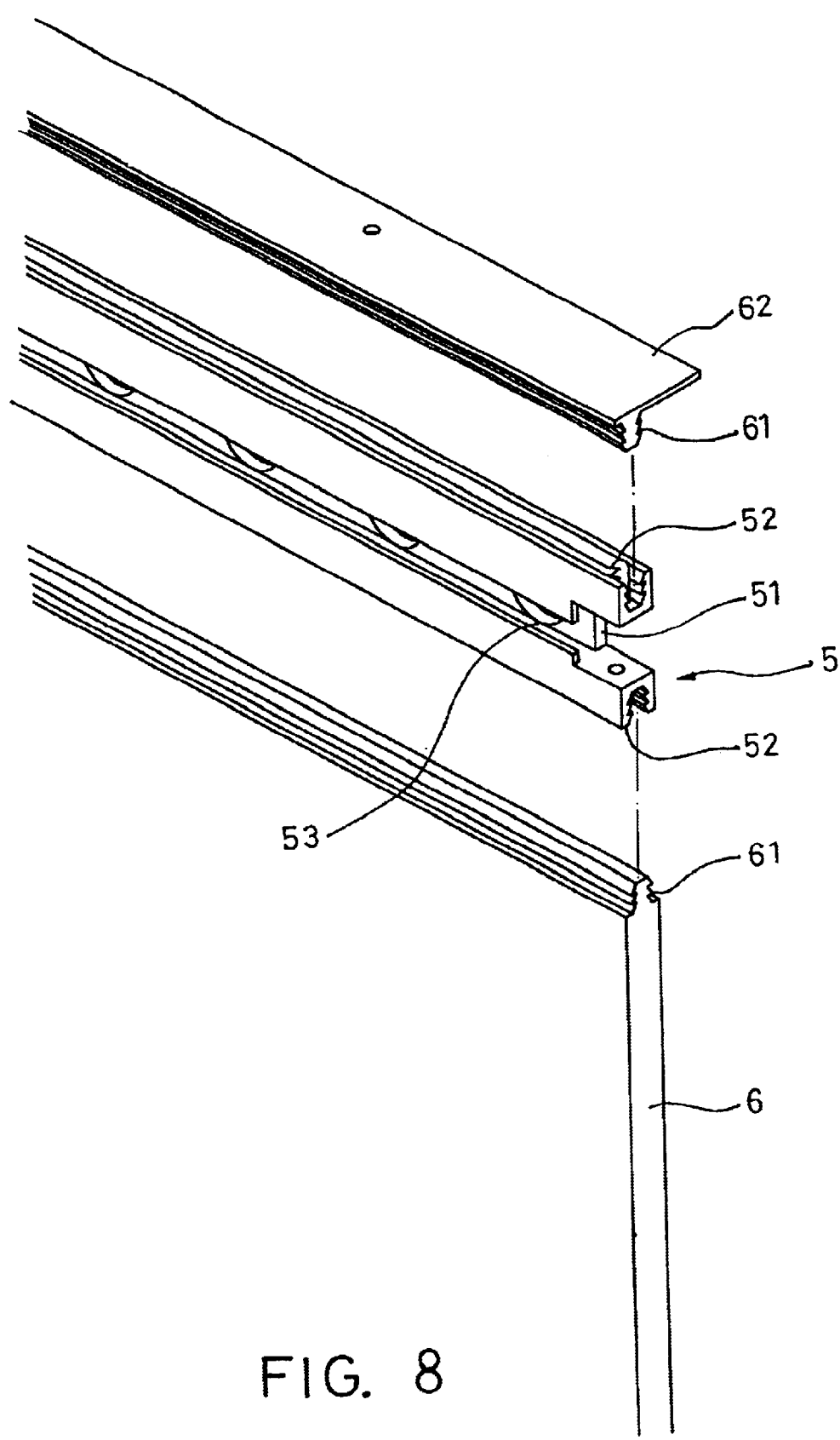
FIG. 8 is a perspective view illustrating a trunking part before fitting with a partition and a top plate.

Referring to FIG. 8 in company with FIG. 2 again, each trunking part 5 is a frame with a fitting recess 51 at two ends thereof respectively such that the coupling piece 34 can be joined to the fitting recess 51 and fastened to the trunking part 5 by way of bolts. Further, the trunking part 5 at both lateral sides thereof provides an engaging flute 52 respectively to fit with an engaging jut edge 61 on a partition 6 or another engaging jut edge 61 on an upper connecting plate 62. In this way, a partition can be set up between two trunking parts 5 and a space can be formed between two opposite fixed partitions for receiving fire prevention and sound insulation stuff. In addition, the fire prevention and sound insulation stuff at both lateral sides thereof are clamped with fixing tools attached to the hanging slots 22. Also, the engaging flute 52 can press the upper plate 62 against the ceiling and the upper plate 62 can be fixedly attached to the ceiling by way of screw fastener. Moreover, the engaging flute 52 can fit with accessories such as a tabletop, a foot pedal or a line groove to enhance the function of the partition and screen system. Besides, the trunking part at the outer surface thereof provides at least a row of hanging slots 53 for hanging articles.

Figure 9:
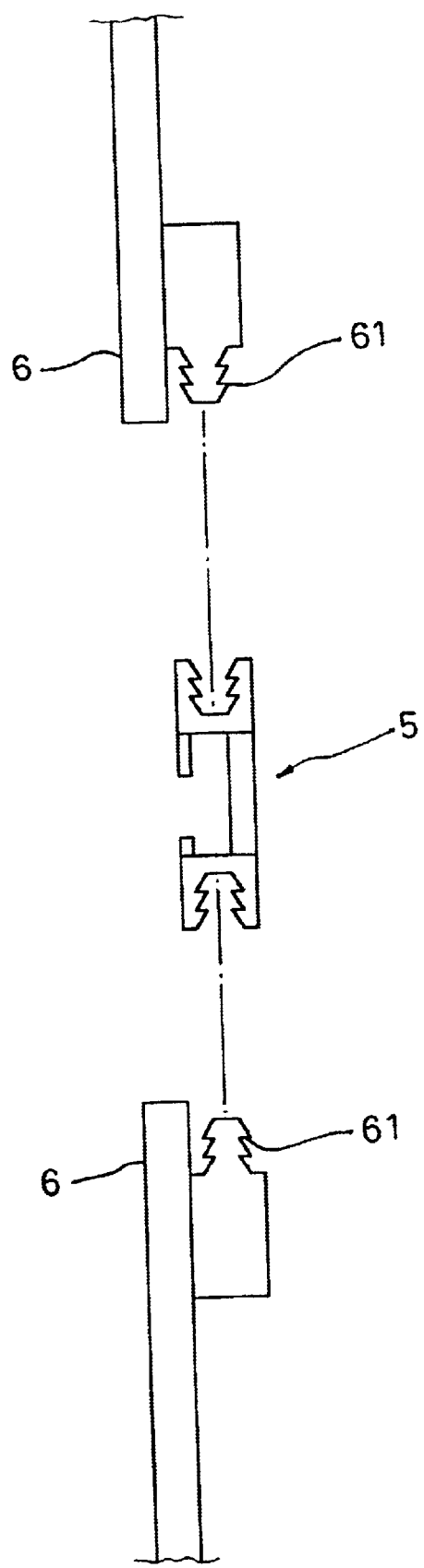
FIG. 9 is a side view illustrating another embodiment of the trunking part.

Referring to FIG. 9, another embodiment of the present invention illustrates the trunking part 5 can fit with an engaging jut 61 attached to a lateral wall surface of each partition 6 instead of at the engaging jut edge on the partition 6.

Figure 10:
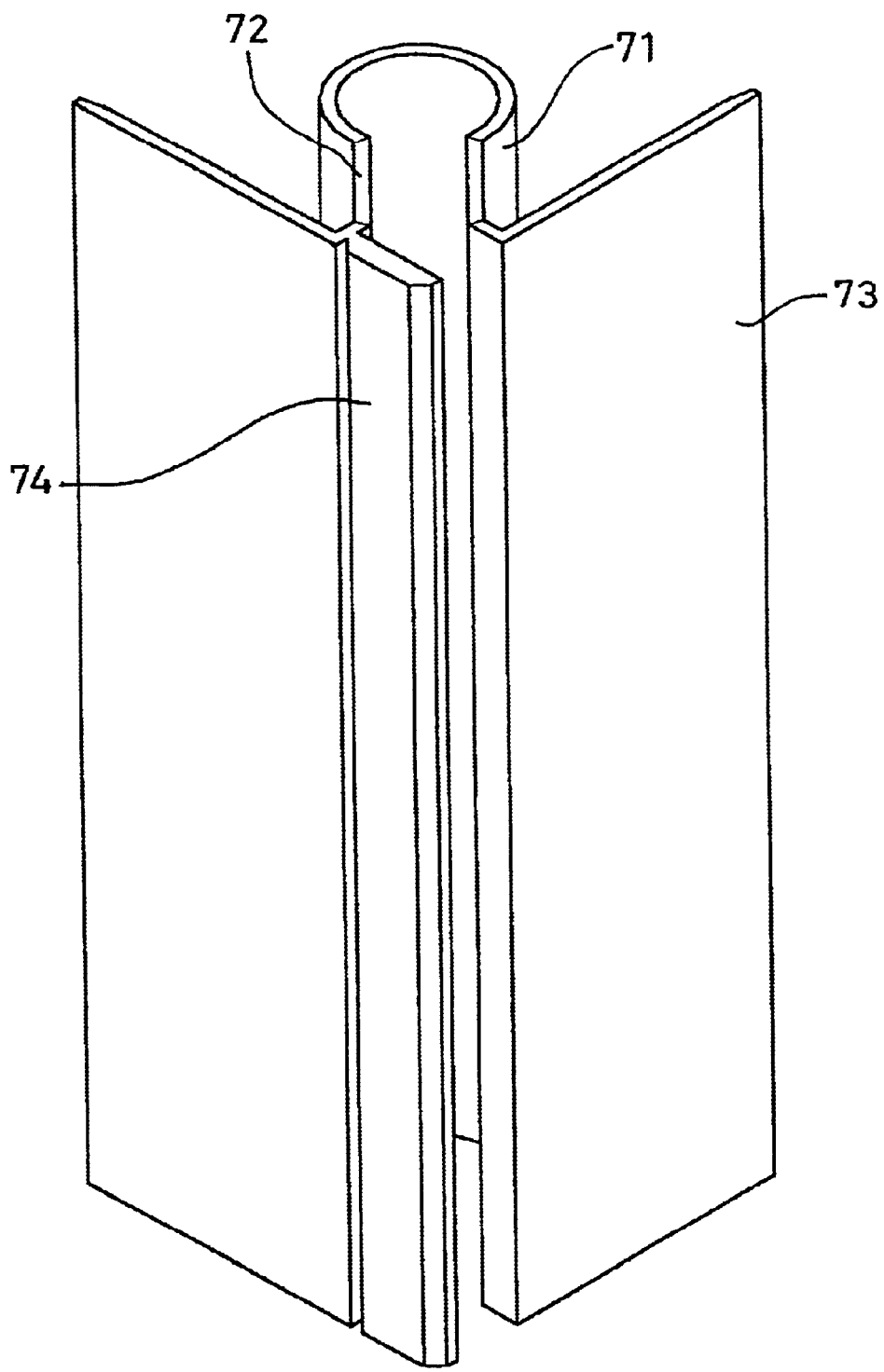
FIG. 10 is a perspective view of an insert frame provided in a connective device of the present invention.
Figure 11:
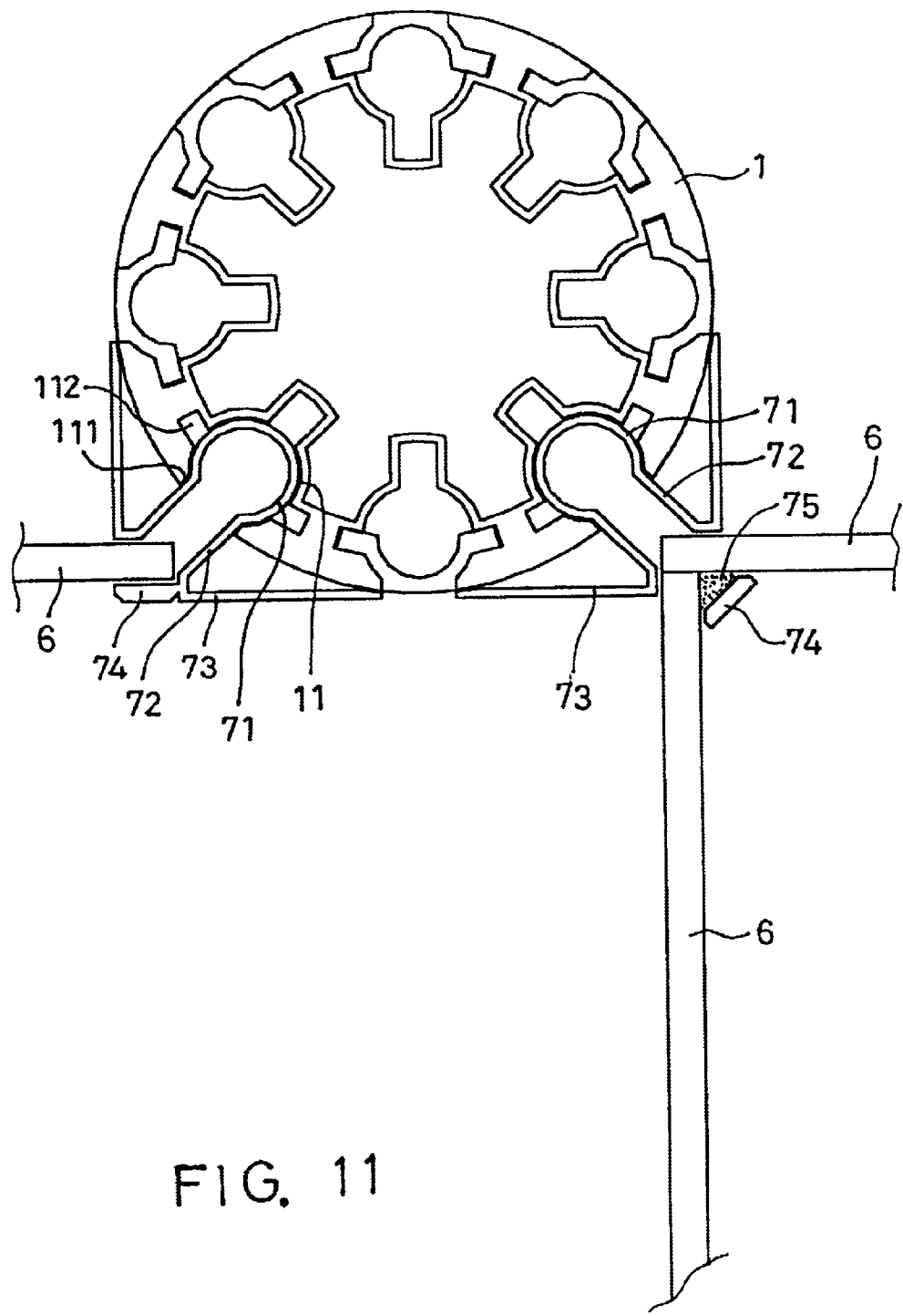
FIG. 11 is a plan view illustrating the upright post joining with insert frame shown in FIG. 10.
Figure 12:
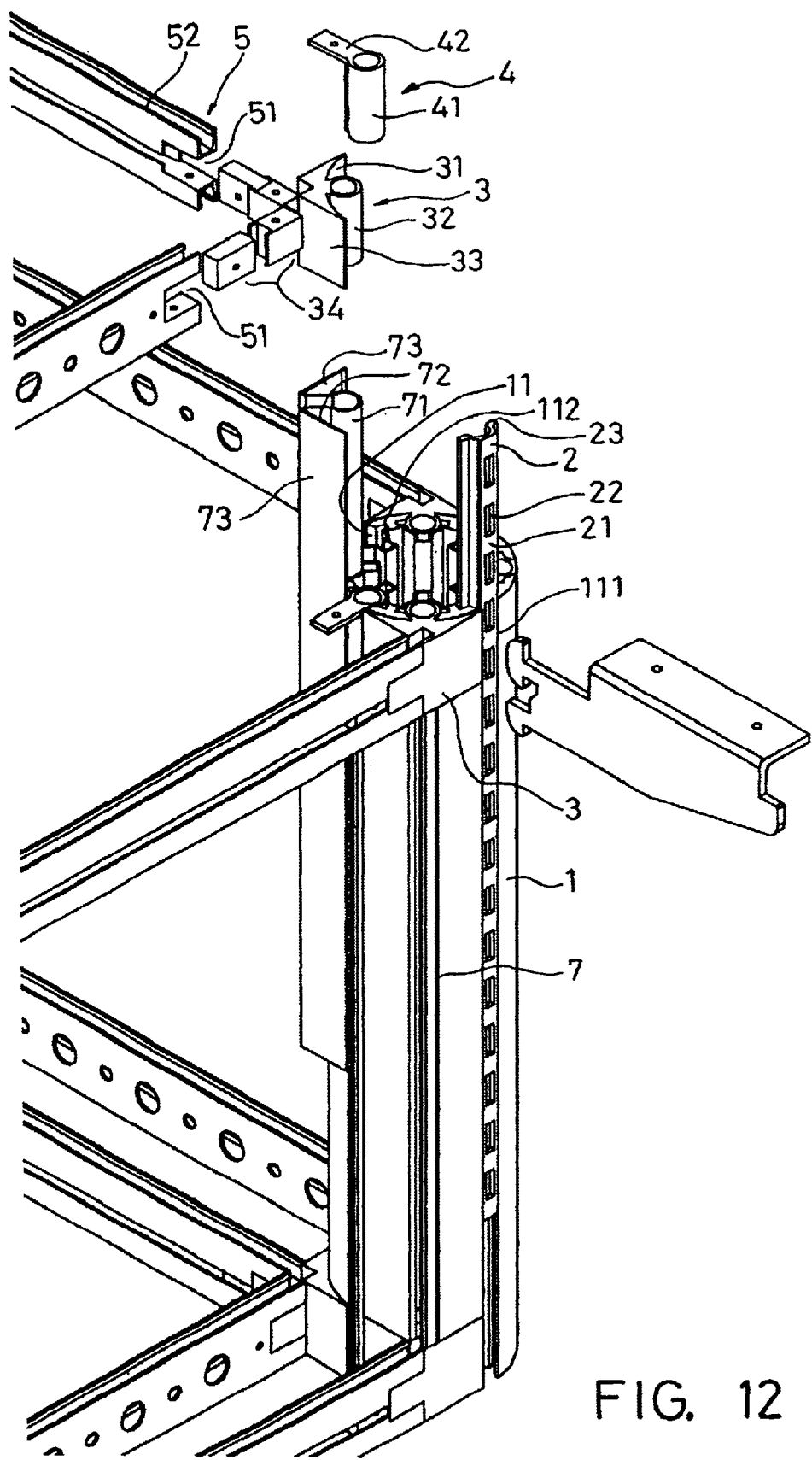
FIG. 12 is a partly exploded perspective view illustrating the insert frame being associated with the upright post in the partition and screen system of the present invention.

Referring to FIG. 10, an inset frame 7 is illustrated. In case of the partition 6 being made of glass, the groove opening 111 of the slide groove 11 on the upright post 1 may expose to the eye. The insert frame 7 can be used instead of the insert strip 2 to hide the groove opening 111 from view. Also, it is possible for the insert frame 7 to engage with the partition 6 longitudinally. The insert frame 7 has a frame cylinder 71 corresponding to the slide groove 11 and two wing plates 73 extend outward from the frame cylinder 71 with a right angle bend. The insert frame 7 basically provides a shape about the same as the retaining pin 3 and one of the wing plates 73 extends backward a breakable plate 74 so that a clearance is formed between the breakable plate 74 and another one of the wing plates 73 for the partition 6 being inserted and located. In case of two perpendicular partitions 6, the breakable plate 74 can be broken off and the end parts of the two partitions 6 can be received in the opening between the two wing plates 73. Further, the elongated breakable plate 74 is placed in an intersection of the two partitions 6 and the filler 75 such as the silicon rubber can be added between the partitions and the breakable plate 74 such that the two mutually perpendicular partitions 6 can be set up completely as shown in FIG. 11. It can be seen in FIG. 12 that the insert frames 7 and the retaining pins 3 are in a state of joining with the upright post 1.

Figure 13:
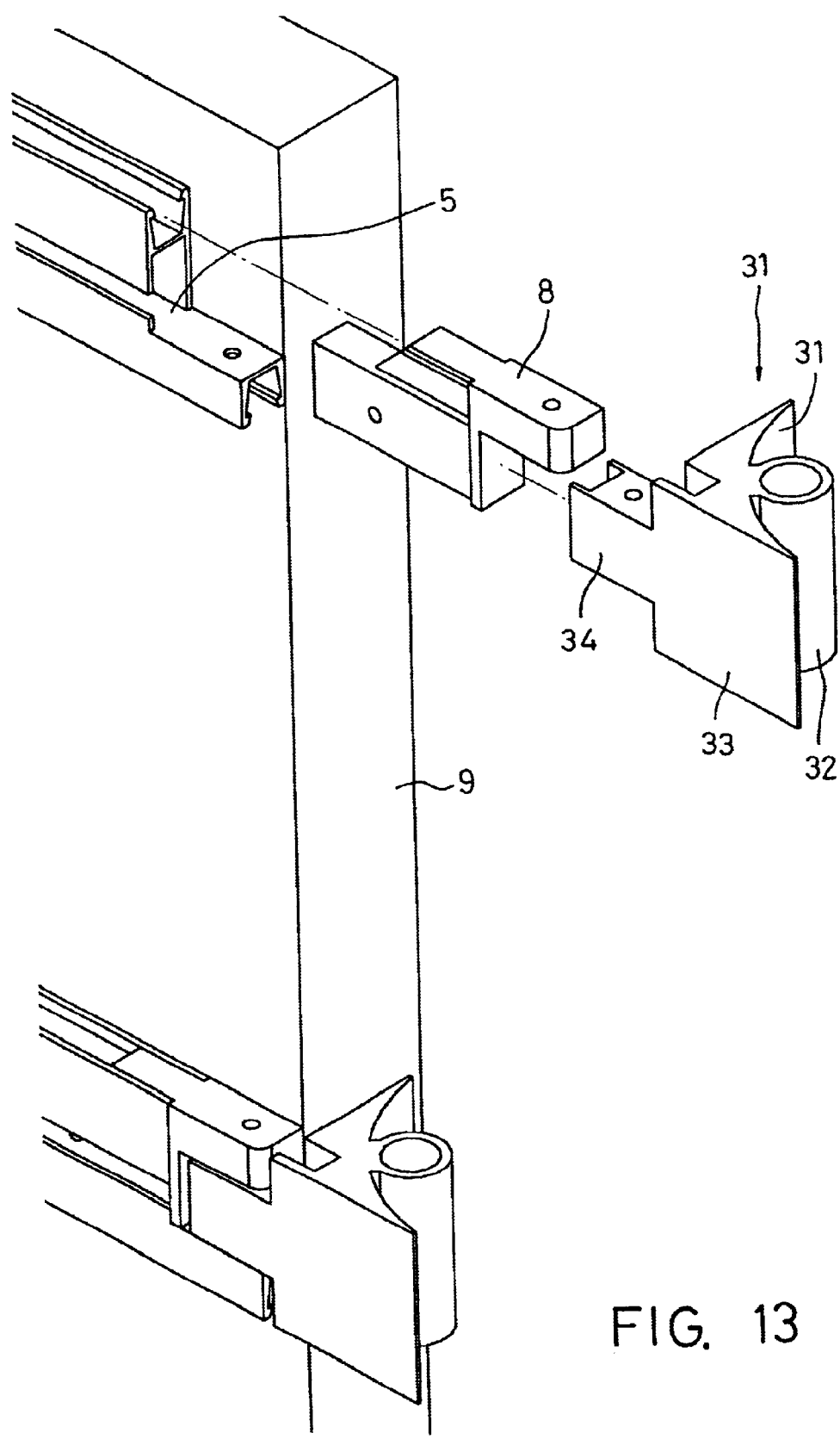
FIG. 13 is a perspective view illustrating the retaining pins in the connective device being joined to a door.

Referring to FIG. 13, the retaining pins 3 can be joined to a door 9 in addition to being joined to the upright post 1. The retaining pins 3 at the coupling pieces 34 thereof can be pivotally attached to a hinge piece 8 respectively and the other end of the hinge piece 8 is fixedly attached to the trunking parts 5. Thus, the door 9 can be opened or shut via the respective hinge piece 8 rotating relative to the respective retaining pin 3.

It is appreciated from the foregoing that the connective device in a partition and screen system according to the present invention offers the following advantages:

(1) A fast assembling can be reached with an accurate positioning. Because the upright post joins the insert strips, the retaining pins and the joint pins by way of insertion fit instead of screw fastening so that it is fast to perform a flexible combination of desired assembly.

(2) An intercalation space can be obtained. Because the trunking part connects with the upright post by way of the retaining pins being tangent to the circumference of the upright post in spite of the trunking part being straight and the upright post being circular, an intercalation space can be formed between two opposite partitions for receiving fire preventive and sound insulation stuff.

(3) It is possible to extend longitudinal and transversely. The slide grooves in an upright post are selectively used for fitting with the insert strips so that it is possible to extend further upright posts transversely and the upright posts can act as transfer posts to extend longitudinal and slantingly as desired without the need of specific transfer posts.

(4) It is easy to be set up and detached. The component parts of the connective device of the present invention are simplified so that less material is needed and the component parts can be used repeatedly to fulfill the requirement of environmental protection.

The connective device in a partition and screen system according to the present invention can be arranged to constitute a variety of assembling combinations for performing different effects. Hence, personal office desks, private conference rooms and project research/test room partitions can be obtained flexibly so that providing private spaces with open communication environment are considered in the present invention. Therefore, the present invention offers a partition and screen system with mobility and humanization.

While the invention has been described with reference to preferred embodiments thereof, it is to be understood that modifications or variations may be easily made without departing from the spirit of this invention, which is defined in the appended claims.

What is claimed is:

1. A connective device in a partition and screen system, comprising:

at least one cylindrical upright post having a plurality of circumferentially spaced apart, longitudinal slide grooves extending along an entire length thereof, each slide groove having an elongated opening;

a plurality of retaining pins selectively inserted into at least one of the plurality of slide grooves, each retaining pin having an arched side with two opposite lateral edges and two flat sides extending from the two opposite lateral edges such that the two flat sides are perpendicular to each other, at least one of the two flat sides having a coupling piece extending outwardly therefrom;

a plurality of trunking parts, each connected to the coupling piece and positioned at upper and lower ends of the upright post; and at least one partition vertically connected between the trunking parts.

2. The connective device in a partition and screen system according to claim 1, further comprising a plurality of insert strips, each having an arched section, disposed in the slide grooves to support the retaining pins in the associated slide groove.

3. The connective device in a partition and screen system according to claim 2, wherein the slide groove comprises two opposite slit sections and the insert strip has two opposite lateral projections inserted into the two slit sections.

4. The connective device in a partition and screen system according to claim 2, wherein the insert strips have a plurality of hanging slots in the arched section and arranged longitudinally so as to line up and be equally spaced within the elongated opening of the associated slide groove.

5. The connective device in a partition and screen system according to claim 1, wherein the upright post has a central, longitudinal through hole.

6. The connective device in a partition and screen system according to claim 1, wherein the arched side of the retaining pin has an arch that is less than one quarter of a circumference of the upright post.

7. The connective device in a partition and screen system according to claim 1, further comprising a plurality of joint pins, each having a pin part fixedly inserted into an upper end and a lower end of a selected one of the slide grooves, and an engaging plate extending laterally from an end of the joint pin.

8. The connective device in a partition and screen system according to claim 1, wherein each of the trunking parts comprises a transverse frame with a fitting recess at two ends thereof fitting with the coupling piece.

9. The connective device in a partition and screen system according to claim 1, wherein each of the trunking parts includes upper and lower engaging flutes, and further comprising a partition having upper and lower engaging jut edges fitting with the engaging flutes of the trunking parts.

10. The connective device in a partition and screen system according to claim 9 including two partitions spaced apart to form an intercalation, and further comprising fire preventive material and sound insulation located in the intercalation with two opposite lateral sides of the fire preventive material and sound insulation are fixed to hanging slots in insert strips located in the slide groove.

11. The connective device in a partition and screen system according to claim 9, further comprising an upper connecting plate engaging the upper engaging flute of the trunking parts, the upper connecting plate also adhered to a ceiling.

12. The connective device in a partition and screen system according to claim 1, wherein each of the trunking parts includes a row of hanging slots.

13. The connective device in a partition and screen system according to claim 1, further comprising an elongate insert frame having a frame cylinder engaging the slide groove and two wing plates extend outwardly from the frame, one of the wing plates including a breakable plate forming a clearance between the breakable plate and another one of the wing plates.

14. The connective device in a partition and screen system according to claim 1, wherein the coupling pieces are pivotally connected to a hinge part, which is attached to a door thereby allowing the door to pivot.

* * * * *